United States Patent
Rung et al.

(10) Patent No.: US 9,479,627 B1
(45) Date of Patent: Oct. 25, 2016

(54) DESKTOP SPEAKERPHONE

(71) Applicant: GN Netcom A/S, Ballerup (DK)

(72) Inventors: Martin Rung, Ballerup (DK); Mads Dyrholm, Ballerup (DK)

(73) Assignee: GN Audio A/S (DK)

( * ) Notice: Subject to any disclaimer, the term of this patent is extended or adjusted under 35 U.S.C. 154(b) by 0 days.

(21) Appl. No.: 14/982,864

(22) Filed: Dec. 29, 2015

(51) Int. Cl.
  *H04M 1/00* (2006.01)
  *H04M 9/00* (2006.01)
  *H04M 1/62* (2006.01)
  *H04M 3/00* (2006.01)

(52) U.S. Cl.
  CPC .............. *H04M 1/62* (2013.01); *H04M 3/002* (2013.01)

(58) Field of Classification Search
  CPC ........ H04M 1/62; H04M 1/20; H04M 3/002; H04M 9/082; H04R 1/342; H04R 1/38; H04R 27/00
  See application file for complete search history.

(56) References Cited

U.S. PATENT DOCUMENTS

| | | | |
|---|---|---|---|
| 5,121,426 A | 6/1992 | Baumhauer, Jr. et al. | |
| 2006/0093128 A1* | 5/2006 | Oxford | H04M 9/082 379/406.01 |
| 2006/0147063 A1* | 7/2006 | Chen | H04M 1/03 381/119 |
| 2006/0233353 A1* | 10/2006 | Beaucoup | H04M 9/082 379/406.01 |
| 2007/0263845 A1* | 11/2007 | Hodges | H04R 1/345 379/388.02 |
| 2011/0194719 A1* | 8/2011 | Frater | H04R 27/00 381/332 |

* cited by examiner

*Primary Examiner* — Tuan D Nguyen
(74) *Attorney, Agent, or Firm* — Altera Law Group, LLC

(57) ABSTRACT

The present invention relates to a desktop speakerphone constructed to make the desktop speakerphone less space-consuming while having improved audio qualities. The desktop speakerphone preferably has two microphone clusters 6, 7 mounted at the upper side of the housing 2 closer towards respective longitudinal ends 8 of the latter, so that each microphone cluster 6, 7 can receive voice sound $A_v$ from one or more of the users. Each microphone cluster 6, 7 preferably comprises three pressure microphones 10, 11, 12. Furthermore, within each microphone cluster 6, 7, the second and third sound inlets 14, 15 are preferably arranged symmetrically on opposite sides of the respective median plane 18. Within each microphone cluster 6, 7, the relative arrangement of the three sound inlets 13, 14, 15 defines a respective microphone axis 9, 19 for each of the microphone pairs 10, 11, 10, 12. The microphone axis 9 of the first microphone pair 10, 11 extends through the first and the second sound inlet 13, 14, while the microphone axis 19 of the second microphone pair 10, 12 extends through the first and the third sound inlet 13, 15. The microphones are connected to multiple array processors, each configured to provide an array signal in dependence on two or more of the multiple microphone signals. First and second array processor configured to provide array signals in dependence on microphone signals.

15 Claims, 8 Drawing Sheets

DESKTOP SPEAKERPHONE

TECHNICAL FIELD

The present invention relates to a desktop speakerphone.

BACKGROUND ART

U.S. Pat. No. 5,121,426 discloses a teleconferencing unit with an upwardly aimed loudspeaker and multiple gradient microphones arranged evenly around the loudspeaker. Each microphone has a polar response pattern with a major lobe. The loudspeaker is located in a null adjacent to the major lobe of each microphone. This reduces acoustic coupling between the loudspeaker and the respective gradient microphones. In one embodiment, the speakerphone has four first-order gradient microphones each having a supercardioid polar response pattern. The nulls are aimed at 125° with respect to the main lobe directions. In another embodiment, the speakerphone has six first-order gradient microphones pairwise electrically connected to form three reversible second-order gradient microphones, each having nulls at 90° and 180°.

The first- and second-order gradient microphones disclosed in the above patent are relatively expensive to manufacture, which makes the disclosed teleconferencing unit relatively expensive as well. In addition, the achievable reduction of acoustic coupling between the loudspeaker and the gradient microphones is limited due to manufacturing tolerances and changing acoustic behavior of the room. Furthermore, the optimum shape of the disclosed teleconferencing unit depends on the desired directional characteristics of the microphones. Also, the disclosed microphones have a relatively low signal-to-noise ratio (SNR) at lower frequencies.

DISCLOSURE OF INVENTION

It is an object of the present invention to provide an improved desktop speakerphone without disadvantages of prior art speakerphones. It is a further object to provide a desktop speakerphone that is relatively inexpensive to manufacture. It is a still further object to provide a desktop speakerphone with few constraints on the design of its physical appearance. It is a still further object to provide a desktop speakerphone that provides high-quality sound.

These and other objects of the invention are achieved by the invention defined in the independent claims and further explained in the following description. Further objects of the invention are achieved by embodiments defined in the dependent claims and in the detailed description of the invention.

Within this document, the term "speakerphone" refers to an audio communication device that can be connected directly or indirectly to an audio communication network and that allows a local party comprising a plurality of party members (users) to simultaneously communicate orally with one or more remote parties via the audio communication network. A speakerphone generally comprises an acoustic input device configured to pick up voices of local party members and an acoustic output device configured to provide an acoustic output signal simultaneously to a plurality of the local party members. An acoustic input device generally comprises one or more acoustic input transducers, such as one or more microphones, and an acoustic output device generally comprises one or more acoustic output transducers, such as one or more loudspeakers or sound drivers. A plurality of local party members may thus simultaneously use a speakerphone as an audio interface to an audio communication network. The above definition includes such speakerphones that comprise circuitry, e.g. landline telephone circuitry, mobile phone circuitry or computer circuitry, which enable the speakerphone to connect directly to an audio communication network, as well as such speakerphones that do not comprise such circuitry and therefore require the use of gateway devices, e.g. landline telephones, mobile phones or personal computers, for connecting to audio communication networks.

A "desktop speakerphone" refers to a speakerphone that is configured to be arranged and used in a stable operating position on a horizontal desktop. Where orientations or directions in space, such as e.g. "vertical", "horizontal", "up", "down", etc., are mentioned herein without further specification, such orientations and directions shall be read as referring to a desktop speakerphone arranged in its operating position for normal use on a horizontal desktop.

Furthermore, when an element or entity is referred to as being "connected" or "coupled" to another element or entity, this includes direct connection (or coupling) as well as connection (or coupling) via intervening elements or entities, unless expressly stated otherwise. Also, unless expressly stated otherwise, when a signal is referred to as being "provided" by a first entity to a second entity, this includes directly or indirectly transmitting the signal in its original form as well as any direct or indirect transmission that modifies the original signal and/or converts the signal into another domain and/or representation before it arrives at the second entity, provided that the information comprised by the signal received by the second entity is sufficient for the second entity to perform the specified actions with respect to the signal.

Within this document, the singular forms "a", "an", and the are intended to include the plural forms as well (i.e. to have the meaning "at least one"), unless expressly stated otherwise. Correspondingly, the terms "has", "includes", "comprises", "having", "including" and "comprising" specify the presence of respective features, operations, elements and/or components, but do not preclude the presence or addition of further entities. The term "and/or" generally includes any and all combinations of one or more of the associated items. The steps or operations of any method disclosed herein need not be performed in the exact order disclosed, unless expressly stated so.

BRIEF DESCRIPTION OF THE DRAWINGS

The invention will be explained in more detail below in connection with preferred embodiments and with reference to the drawings in which.

The figures are schematic and simplified for clarity, and they just show details essential to understanding the invention, while other details may be left out. Where practical, like reference numerals and/or names are used for identical or corresponding parts.

MODE(S) FOR CARRYING OUT THE INVENTION

Figure 1:
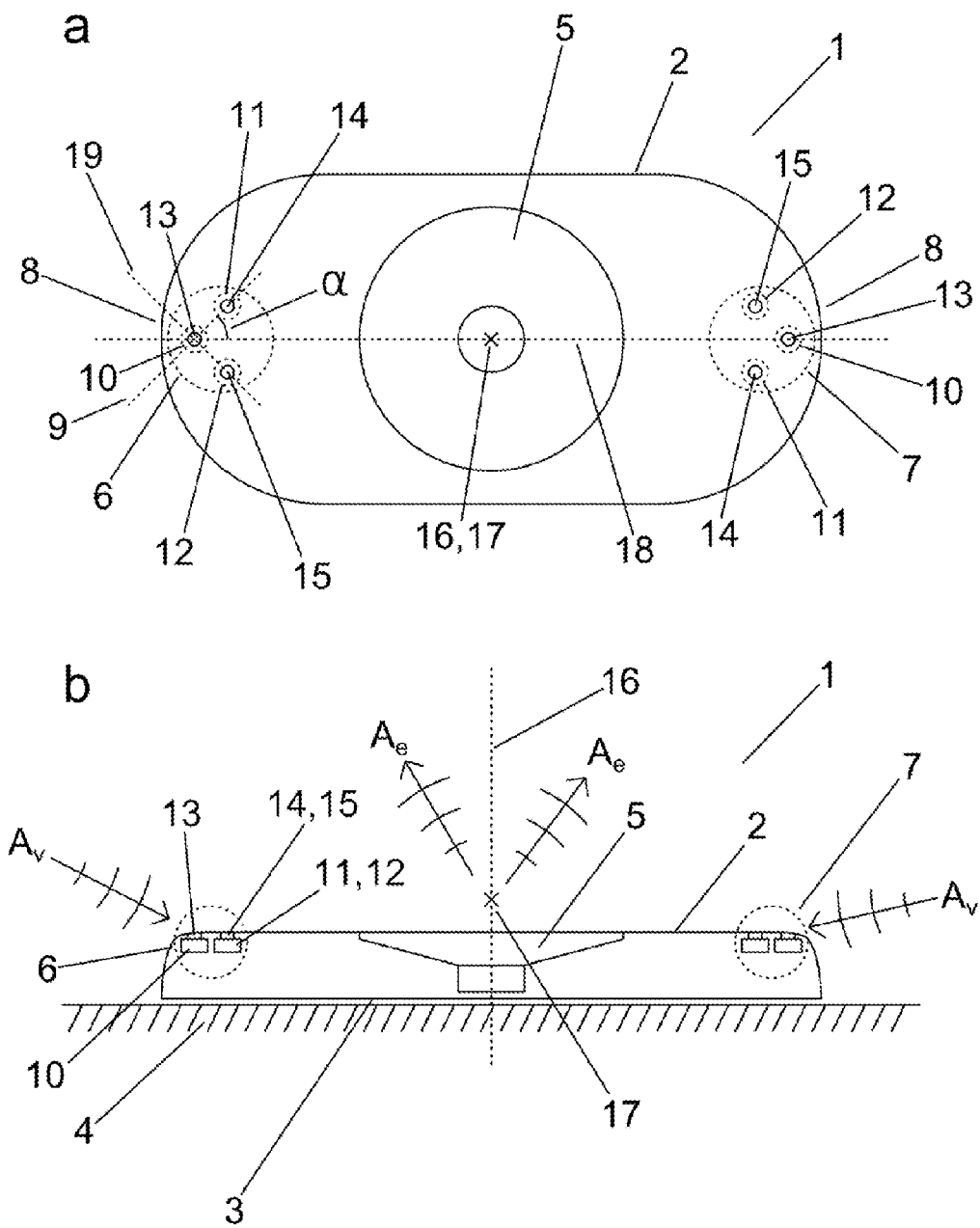
FIG. 1 shows an embodiment of a desktop speakerphone according to the invention.

The desktop speakerphone 1 shown in a top view in FIGS. 1a and 1n a section-like side view in FIG. 1b comprises a housing 2 with a support surface 3. The housing 2 has a shape generally as an elongate disc, and the support surface 3 is located at one of the main surfaces of the elongated disk, so that the support surface 3 can support the desktop speakerphone 1 in a stable operating position on a horizontal surface, such as e.g. a desktop 4. The desktop speakerphone 1 further comprises an upwardly directed sound driver 5 mounted centrally at the upper side of the housing 2, so that the sound driver 5 can emit speaker sound $A_e$ to multiple users of the desktop speakerphone 1 simultaneously. The desktop speakerphone 1 further comprises two microphone clusters 6, 7 mounted at the upper side of the housing 2 closer towards respective longitudinal ends 8 of the latter, so that each microphone cluster 6, 7 can receive voice sound $A_v$ from one or more of the users. Each microphone cluster 6, 7 comprises three pressure microphones 10, 11, 12, each fluidly connected to receive voice sound $A_v$ from the environment through a respective sound inlet 13, 14, 15 arranged at the housing 2.

An imaginary center line 16 is defined so that it extends perpendicularly to the support surface 3 through the acoustic center 17 of the sound driver 5. For each microphone cluster 6, 7, an imaginary median plane 18 is defined so that it comprises the center line 16 and further extends through the first sound inlet 13 of the respective microphone cluster 6, 7. In the desktop speakerphone 1 shown in FIG. 1, the sound inlets 13, 14, 15 of the first microphone cluster 6 are arranged symmetrically to the corresponding sound inlets 13, 14, 15 of the second microphone cluster 7 with respect to the center line 16, and the median planes 18 for the two microphone clusters 6, 7 therefore coincide in space and further are rotationally symmetric with respect to the center line 16. With the desktop speakerphone 1 placed in its operating position on a horizontal surface 4, both the center line 16 and the median planes 18 extend vertically.

All sound inlets 13, 14, 15 are arranged at equal distance from the support surface 3, i.e. in the same horizontal plane when the desktop speakerphone 1 is in its operating position. Furthermore, within each microphone cluster 6, 7, the second and third sound inlets 14, 15 are arranged symmetrically on opposite sides of the respective median plane 18. Within each microphone cluster 6, 7, the first and second microphones 10, 11 constitute a first microphone pair 10, 11, while the first and third microphones 10, 12 constitute a second microphone pair 10, 12.

Within each microphone cluster 6, 7, the relative arrangement of the three sound inlets 13, 14, 15 defines a respective microphone axis 9, 19 for each of the microphone pairs 10, 11, 10, 12. The microphone axis 9 of the first microphone pair 10, 11 extends through the first and the second sound inlet 13, 14, while the microphone axis 19 of the second microphone pair 10, 12 extends through the first and the third sound inlet 13, 15. The three sound inlets 13, 14, 15 are arranged such that the first and the second microphone axes 9, 19 are perpendicular to each other and so that each of the first and the second microphone axis 9, 19 has an angle α of 45° with the median plane 18. The first sound inlet 13 is arranged with a larger distance to the center line 16 than each of the second and third sound inlets 14, 15.

Figure 2:
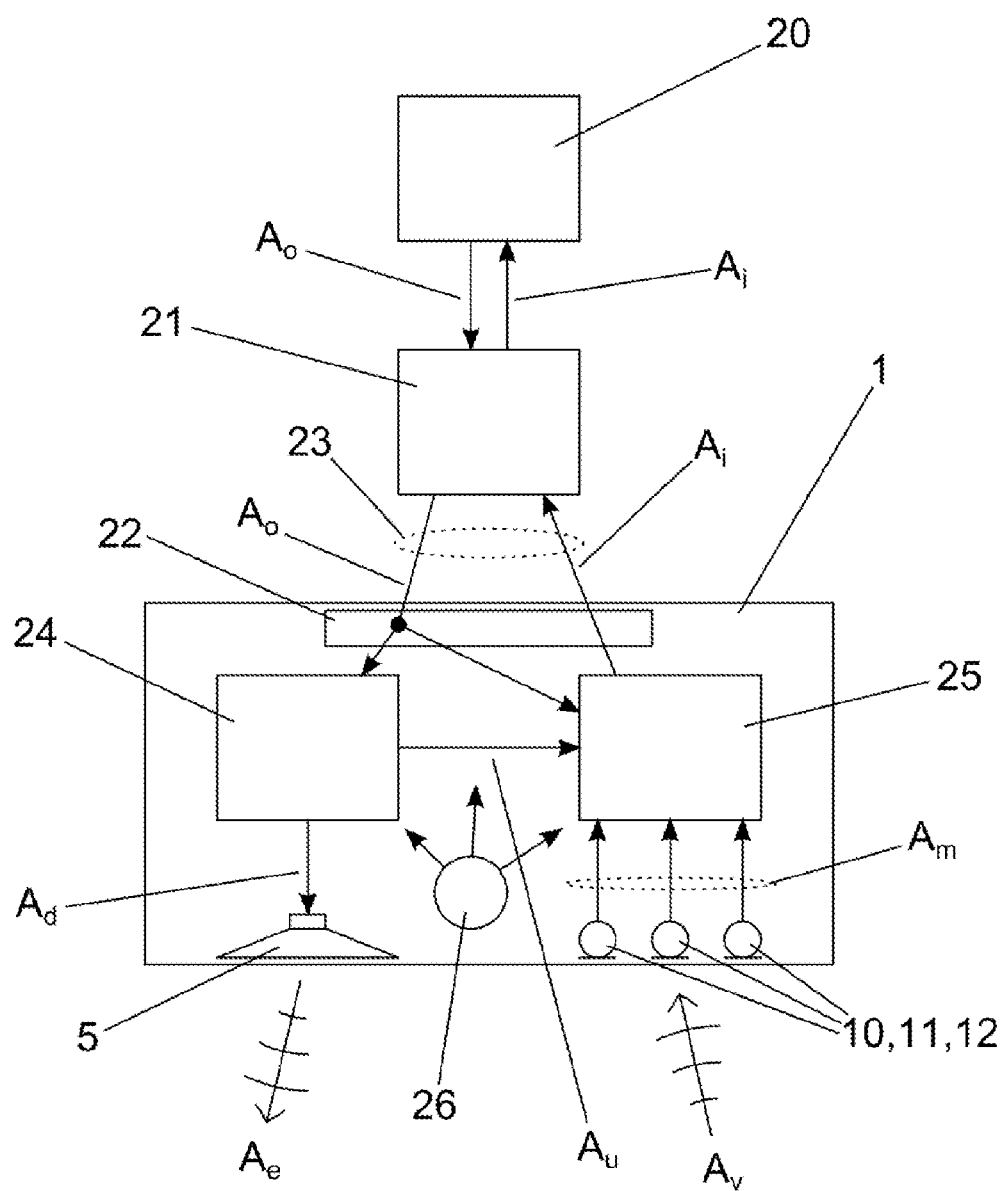
FIG. 2 shows a block diagram of the desktop speakerphone of FIG. 1.

In the block diagram in FIG. 2, the desktop speakerphone 1 is shown connected to an audio communication network 20 through a gateway device 21. The gateway device 21 serves as an interface between the desktop speakerphone 1 and the audio communication network 20, such that the desktop speakerphone 1 may receive an audio output signal $A_o$ from the audio communication network 20 and provide an audio input signal $A_i$ to the audio communication network 20. The gateway device 21 may convey, convert and/or adapt any of the audio output signal $A_o$ and the audio input signal $A_i$, and may further provide call signaling and/or other control functions, as known from prior art gateway devices, in order to enable users of the desktop speakerphone 1 to communicate orally with remote parties through the audio communication network 20. In some embodiments, a gateway device 21, such as e.g. a desktop telephone, a mobile phone, a personal computer with a softphone, or the like, may be comprised by the desktop speakerphone 1. In some embodiments, the desktop speakerphone 1 may be directly connectable to an audio communication network 20.

The desktop speakerphone 1 comprises a transceiver 22 that through a bidirectional connection 23 receives the audio output signal $A_o$ from the audio communication network 20 and/or the gateway device 21, transmits the audio input signal $A_i$ to the audio communication network 20 and/or the gateway device 21 and further handles control functions associated therewith as known from prior art speakerphones. The desktop speakerphone 1 further comprises an output path 24 that provides a driver signal $A_d$ to the sound driver 5 in dependence on the audio output signal $A_o$ that is received through the transceiver 22. The sound driver 5 emits speaker sound $A_e$ to the environment in dependence on the driver signal $A_d$. The desktop speakerphone 1 further comprises an input path 25 that provides the audio input signal $A_i$ through the transceiver 22 in dependence on microphone signals $A_m$ received from the microphones 10, 11, 12 of the two microphone clusters 6, 7, which provide the microphones signals $A_m$ in response to voice sound $A_v$ received from the environment through the respective sound inlets 13, 14, 15. The input path 25 further receives the audio output signal $A_o$ from the transceiver 22 for use in acoustic feedback reduction and a level-controlled signal $A_u$ from the output path 24 for use in noise reduction as explained further below. The desktop speakerphone 1 further comprises a rechargeable battery or other suitable power supply 26 for supplying electric energy to components of the desktop speakerphone 1, such as e.g. the transceiver 22, the output path 24 and the input path 25. The transceiver 22 may be implemented as a wired or as a wireless transceiver and may further be implemented to connect with the audio communication network 20 and/or the gateway device 21 through an analog connection 23 or preferably a digital connection 23, such as e.g. a Bluetooth connection, an IrDA connection, a DECT connection or a USB connection.

Figure 3:
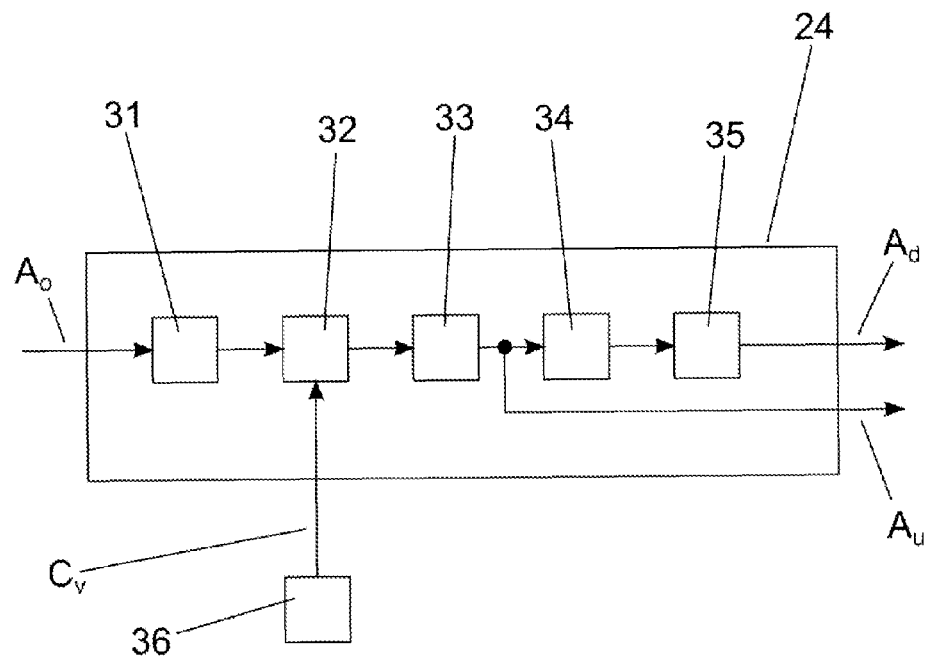
FIG. 3 shows details of an output path shown in FIG. 2.

As shown in FIG. 3, the output path 24 comprises an emphasis filter 31, a volume control 32, a limiter 33, a digital-to-analog converter 34 and a power amplifier 35 connected in series to receive the audio output signal $A_o$, modify the audio output signal $A_o$ and provide the modified signal as the driver signal $A_d$. The emphasis filter 31 applies a frequency-dependent gain to the audio output signal $A_o$ to emphasize frequency regions important for the understanding of speech and/or to compensate, at least partly, for frequency dependencies in the audio communication network 20, the gateway device 21 and/or the sound driver 5. The volume control 32 applies a variable output gain to the filtered signal to provide the level-controlled signal $A_u$. The volume control 32 controls the output gain in dependence on a volume control signal $C_v$ received from a user interface 36 and indicating user input detected by the user interface 36. The limiter 33 applies a frequency-dependent level compression, level attenuation and/or level limitation to the level-controlled signal $A_u$ to prevent the sound driver 5 from emitting too loud sound $A_e$, such as sound $A_e$ with unpleasant or harmful sound pressure levels. The digital-to-analog converter 34 converts the limited signal into an analog signal that is amplified by the power amplifier 35 to provide the driver signal $A_d$.

Figure 4:
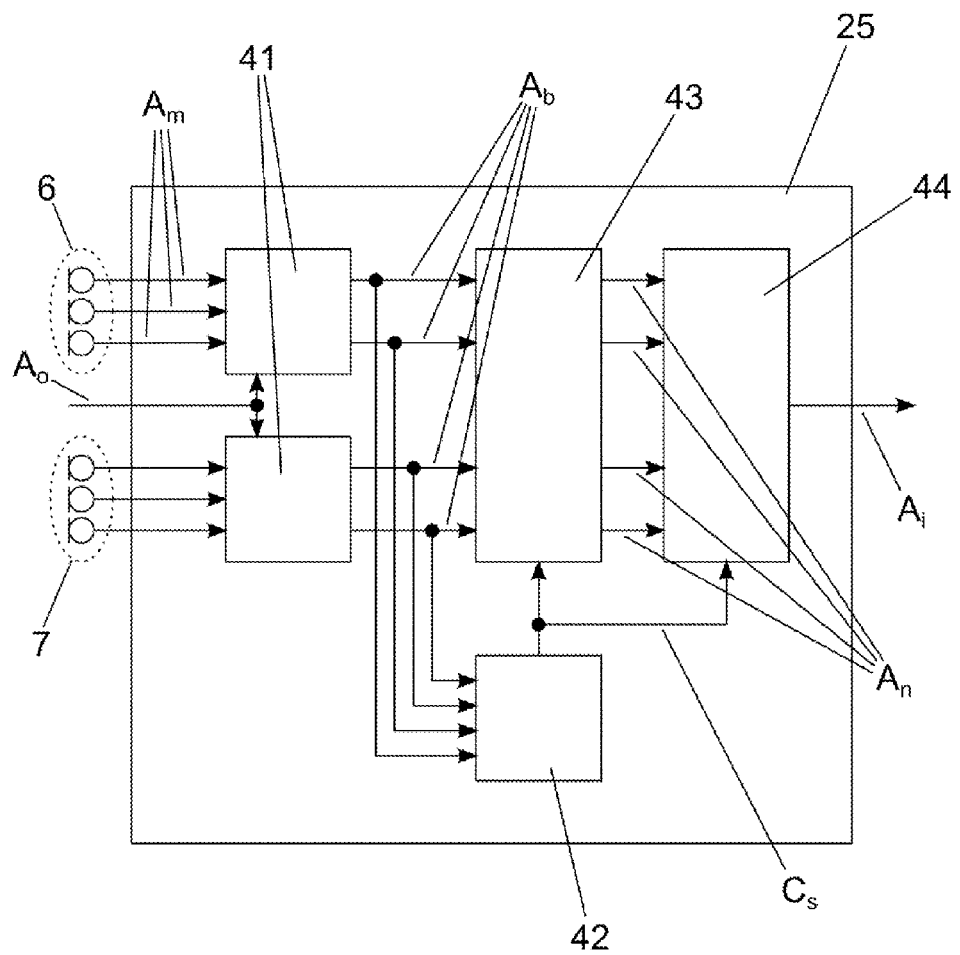
FIG. 4 shows details of an input path shown in FIG. 2.

As shown in FIG. 4, the input path 25 comprises, for each of the two microphone clusters 6, 7, a cluster input processor 41 that provides two beam signals $A_b$ in dependence on the microphone signals $A_m$ received from the microphones 10, 11, 12 of the respective microphone cluster 6, 7 as well as on the audio output signal $A_o$ and the level-controlled signal $A_u$. The input path 25 further comprises a speech detector 42, a speech level normalizer 43 and a beam selector 44. The speech detector 42 receives the beam signals $A_b$ from the cluster input processors 41, for each beam signal $A_b$ estimates whether or not voice signals are present in the respective beam signal $A_b$ and provides a speech detection signal $C_s$ comprising an indication of the result of this estimation. The speech detector 42 further estimates the levels of voice signals present in the beam signals $A_b$ and provides in the speech detection signal $C_5$ an indication of the estimated speech levels. The speech level normalizer 43 receives the beam signals $A_b$ from the cluster input processors 41 and the speech detection signal $C_5$ from the speech detector 42, applies an individual beam gain to each beam signal $A_b$ to provide a respective normalized signal $A_n$ and controls the individual beam gains in dependence on the speech levels indicated in the speech detection signal $C_5$ such that differences in speech levels between the normalized signals $A_n$ are reduced compared to differences in speech levels between the beam signals $A_b$. The speech level normalizer 43 may e.g. increase the level of beam signals $A_b$ with lower speech levels and/or decrease the level of beam signals $A_b$ with higher speech levels among the estimated speech levels. The beam selector 44 receives the normalized signals $A_n$ from the speech level normalizer 43 as well as the speech detection signal $C_s$ from the speech detector 42, selects a preferred signal among the normalized signals $A_n$ in dependence on the speech levels indicated in the speech detection signal $C_s$, such that the preferred signal corresponds to the beam signal $A_b$ having the higher speech level among the estimated speech levels, and provides the preferred signal as the audio input signal $A_i$.

Figure 5:
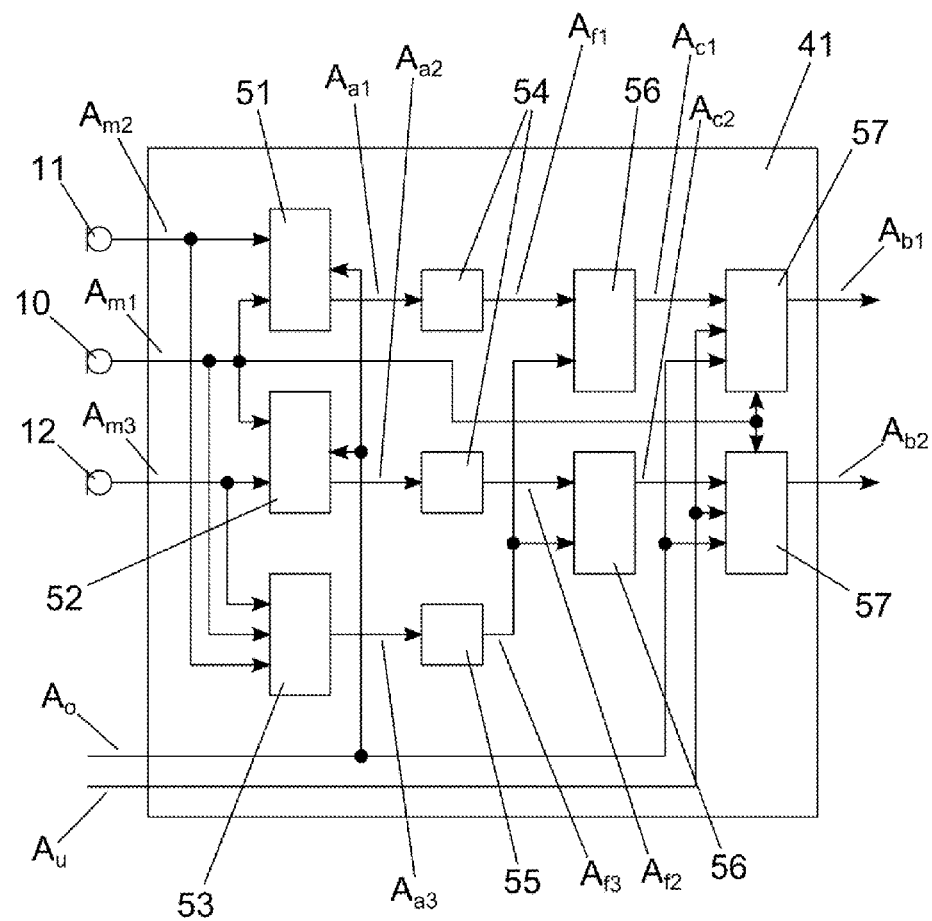
FIG. 5 shows details of a cluster input processor shown in FIG. 4.

As shown in FIG. 5, each cluster input processor 41 comprises two high-frequency array processors 51, 52, a low-frequency array processor 53, two high-pass filters 54, a low-pass filter 55, two adders 56 and two residual-echo cancellers 57.

The first high-frequency array processor 51 provides a first array signal $A_{a1}$ in dependence on a first pair of microphone signals $A_{m1}, A_{m2}$ from a first microphone array 10, 11, which comprises the first microphone 10 and the second microphone 11, and in further dependence on the audio output signal $A_o$. The second high-frequency array processor 52 provides a second array signal $A_{a2}$ in dependence on a second pair of microphone signals $A_{m1}, A_{m3}$ from a second microphone array 10, 12, which comprises the first microphone 10 and the third microphone 12, and in further dependence on the audio output signal $A_o$.

For ease of reading, the following will be adhered to in the following text: The sound inlet 13 of the first microphone 10 will be referred to as a front sound inlet, while the sound inlets 14, 15 of the second and the third microphones 11, 12 will be referred to as rear sound inlets. Correspondingly, the first microphone 10 will be referred to as a front microphone, while the second and the third microphones 11, 12 will be referred to as rear microphones. Also, the microphone signal $A_{m1}$ from the first microphone 10, which is received by both high-frequency array processors 51, 52, will be referred to as a front microphone signal, while the microphone signals $A_{m1}, A_{m2}$ from the second and the third microphones 11, 12, which is each received by only one of the high-frequency array processors 51, 52, will be referred to as rear microphone signals. Also, for each microphone array 10, 11, 10, 12, the direction from the respective rear sound inlet 14, 15 along the respective microphone axis 9, 19 towards the front sound inlet 13 will be referred to as the front direction.

Thus, each high-frequency array processor 51, 52 receives a front microphone signal $A_{m1}$ as well as a respective one of the rear microphone signals $A_{m2}, A_{m3}$ and provides a respective one of the first and the second array signal $A_{a1}, A_{a2}$ in dependence hereon. As explained in further detail further below, each high-frequency array processor 51, 52 controls the directivity pattern of the respective array signal $A_{a1}, A_{a2}$ such that the directivity pattern has a main lobe generally oriented towards the front direction of the respective microphone array 10, 11, 10, 12 and such that the directivity pattern further exhibits reduced sensitivity towards the sound driver 5.

The first microphone signal $A_{m1}$ provided by the first microphone 10 is used for providing both the first and the second array signal $A_{a1}, A_{a2}$, which may make the desktop speakerphone 1 less space-consuming and less expensive to manufacture than prior art speakerphones. Also, the use of pressure microphones, i.e. omnidirectional microphones, may make the desktop speakerphone 1 less expensive to manufacture than prior art speakerphones and may further provide greater versatility with respect to the over-all design of the housing 2 of the desktop speakerphone 1 without compromising the effectiveness of the directional microphone system 6, 7.

The low-frequency array processor 53 provides a mainly non-directional array signal $A_{a3}$ by adding the microphone signals $A_{m1}, A_{m2}, A_{m3}$ from all of the three microphones 10, 11, 12, which thus form a third microphone array. The non-directionality is achieved through in-phase adding of the microphone signals $A_{m1}, A_{m2}, A_{m3}$ and subsequent low-pass filtering in the low-pass filter 55 (see below).

The two high-pass filters 54 each receives and high-pass filters a respective one of the first and the second array signal $A_{a1}, A_{a2}$ to provide a respective high-pass filtered signal $A_{f1}, A_{f2}$. The low-pass filter 55 receives and low-pass filters the mainly non-directional array signal $A_{a3}$ to provide a low-pass filtered signal $A_{f3}$. Each of the two adders 56 receives a respective one of the high-pass filtered signals $A_{f1}, A_{f2}$ as well as the low-pass filtered signal $A_{f3}$ and adds the respective high-pass filtered signal $A_{f1}, A_{f2}$ to the low-pass filtered signal $A_{f3}$ to provide a respective combined array signal $A_{c1}, A_{c2}$. Each of the two residual-echo cancellers 57 receives a respective one of the combined array signals $A_{c1}, A_{c2}$, the front microphone signal $A_{m1}$, the audio output signal $A_o$ as well as the level-controlled signal $A_u$ from the output path 24 and provides a respective beam signal $A_{b1}$, $A_{b2}$ in dependence hereon.

Each residual-echo canceller 57 may employ any know method for cancelling or otherwise suppressing residual feedback from the sound driver 5 in the respective beam signal $A_{b1}$, $A_{b2}$. One such known method is based on processing the respective combined array signal $A_{c1}$, $A_{c2}$ in multiple frequency bands and attenuating the combined array signal $A_{c1}$, $A_{c2}$ in those frequency bands wherein its signal level correlates with the signal level of the audio output signal $A_o$ in the same frequency band.

Figure 6:
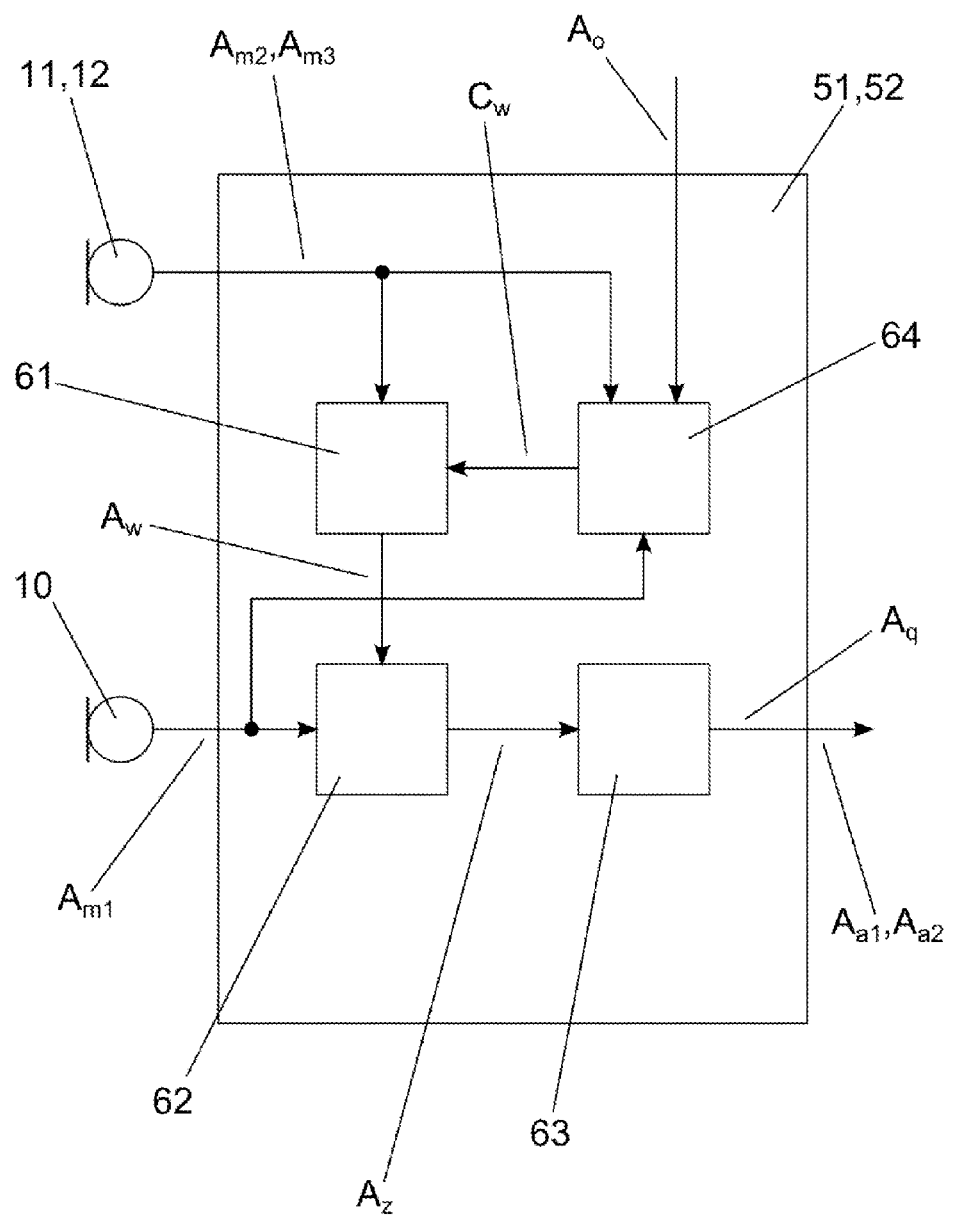
FIG. 6 shows details of a high-frequency array processor shown in FIG. 5.

As shown in FIG. 6, each high-frequency array processor 51, 52 comprises a controllable filter 61, a subtractor 62, an equalizer 63 and a filter controller 64. The controllable filter 61 receives the rear microphone signal $A_{m2}$, $A_{m3}$ from the respective microphone array 10, 11, 10, 12, filters the rear microphone signal $A_{m2}$, $A_{m3}$ using a first set of filter coefficients $C_w$ received from the filter controller 64 and provides the filtered signal $A_w$ to the subtractor 62. The subtractor 62 subtracts the filtered signal $A_w$ from the front microphone signal $A_{m1}$ and provides the resulting difference signal $A_z$ to the equalizer 63. The equalizer 63 filters the difference signal $A_z$ using a second set of filter coefficients $C_q$ to provide an equalized signal $A_q$. The main purpose of the equalizer 63 is to compensate for some of the level distortion caused by the subtractor 62. The equalizer 63 is preferably configured for a reference situation wherein the front microphone 10 and the rear microphone 11, 12 solely receive voice sound $A_v$ from a user located at a reference location in the far field and in the front direction of the respective microphone array 10, 11, 10, 12. The second set of filter coefficients $C_q$ may thus be fixed at design or production time and may preferably be configured to reduce or minimize, within one or more predefined frequency ranges, the level difference between the equalized signal $A_q$ and the front microphone signal $A_{m1}$ in the reference situation. The high-frequency array processor 51, 52 provides the equalized signal $A_q$ as the respective array signal $A_{a1}$, $A_{a2}$. Each array signal $A_{a1}$, $A_{a2}$ thus constitutes an output signal of a differential microphone array 10, 11, 10, 12 comprising a front microphone 10 and a respective rear microphone 11, 12.

The filter controller 64 receives the front microphone signal $A_{m1}$, the rear microphone signal $A_{m2}$, $A_{m3}$ as well as the audio output signal $A_o$ and adaptively determines the first set of filter coefficients $C_w$ such that in the array signal $A_{a1}$, $A_{a2}$, sound $A_e$ emitted by the sound driver 5 is suppressed or attenuated relative to voice sound $A_v$ arriving from the front direction of the microphone array 10, 11, 10, 12. The filter controller 64 thus controls the directivity pattern of the microphone array 10, 11, 10, 12 such that the directivity pattern has reduced sensitivity towards the sound driver 5, at least when compared to the sensitivity in the front direction, preferably also when compared to the average sensitivity across all directions.

The filter controller 64 preferably determines the first set of filter coefficients $C_w$ according to an adaptation algorithm that provides a reduction in the coherence between the array signal $A_{a1}$, $A_{a2}$ and the audio output signal $A_o$ under the constraint that voice sound $A_v$ received from the front direction is substantially maintained in the array signal $A_{a1}$, $A_{a2}$. Thus, the directivity pattern of the microphone array 10, 11, 10, 12 is adaptively controlled to reduce acoustic feedback from the sound driver 5 in the array signal $A_{a1}$, $A_{a2}$ and thus also in the audio input signal $A_i$. Numerous such adaptation algorithms are known from the prior art and may be used for this purpose. Preferred algorithms are described in the following.

Figure 7:
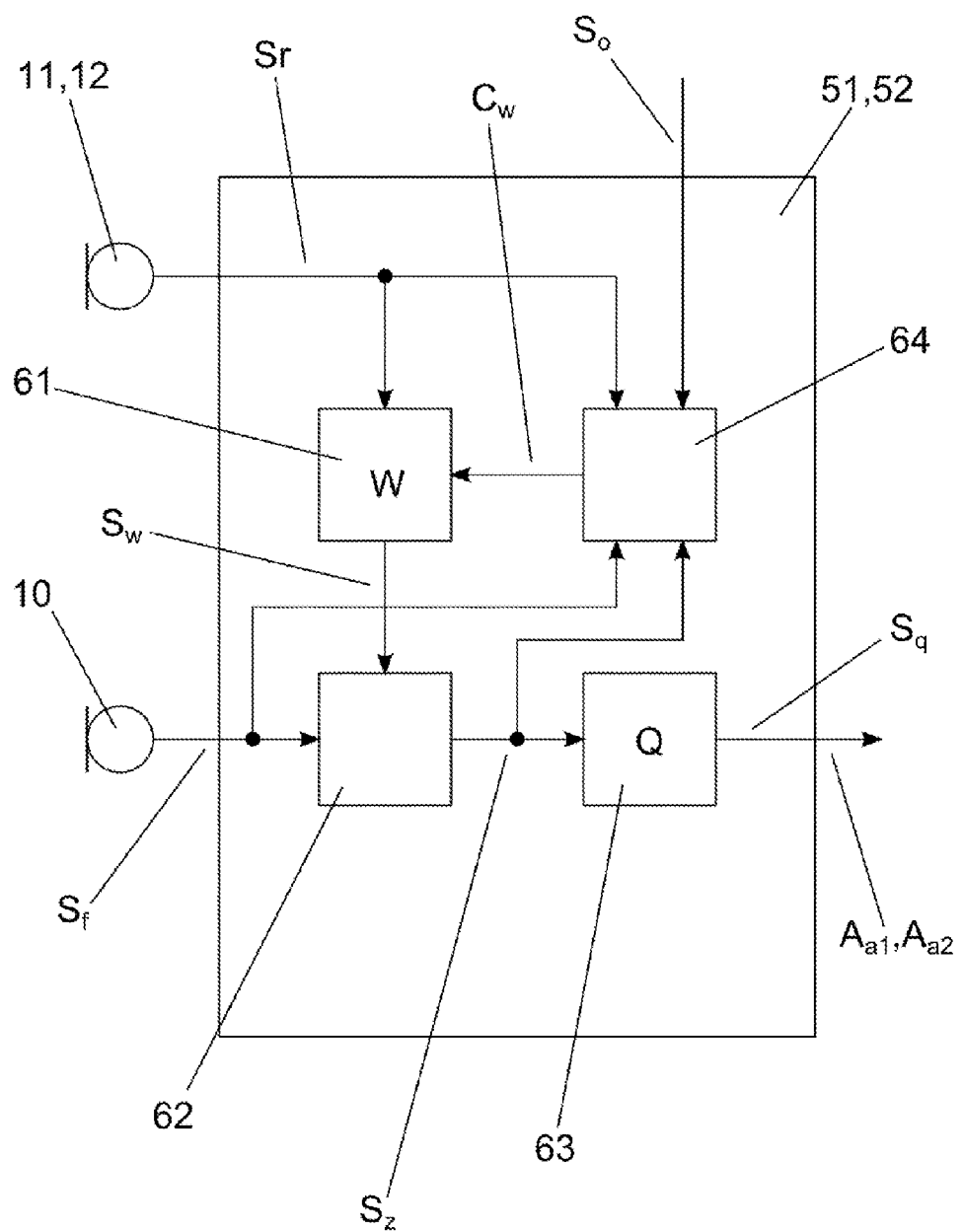
FIG. 7 shows a frequency-domain block diagram of the high-frequency array processor shown in FIG. 6.

The block diagram shown in FIG. 7 is substantially a frequency-domain version of FIG. 6. Thus, the rear microphone spectrum Sr is the frequency spectrum of the rear microphone signal $A_{m2}$, $A_{m1}$, the front microphone spectrum Sf is the frequency spectrum of the front microphone signal $A_{m1}$, the difference spectrum Sz is the frequency spectrum of the difference signal $A_z$ from the subtractor 62, the equalized spectrum Sq is the frequency spectrum of the equalized signal $A_q$—and of the array signal $A_{a1}$, $A_{a2}$ provided by the high-frequency array processor 51, 52, and the audio output spectrum So is the frequency spectrum of the audio output signal $A_o$. The transfer function W is the transfer function of the controllable filter 61, and the transfer function Q is the transfer function of the equalizer 63. In addition to the front microphone signal $A_{m1}$, also the difference signal $A_z$ from the subtractor 62 is provided to the filter controller 64. As will be understood from the following description, the filter controller 64 may determine the first set of filter coefficients $C_w$ in dependence on any of these signals.

In the shown embodiment of the high-frequency array processor 51, 52, the equalized spectrum, i.e. the spectrum of the of the array signal $A_{a1}$, $A_{a2}$, thus equals:

$$Sq = Q \cdot Sz = Q \cdot (Sf - W \cdot Sr) \quad (1)$$

The sound $A_e$ emitted by the sound driver 5 will be received by each of the front and the rear microphone 10, 11, 12 and will thus also appear in the front and the rear microphone spectrum Sf, Sr. In the following, the portion of the front microphone spectrum Sf that originates from the sound driver 5 is referred to as Sfe, the portion of the rear microphone spectrum Sr that originates from the sound driver 5 is referred to as Sre, and the portion of the difference spectrum Sz that originates from the sound driver 5 is referred to as Sze. Applying equation (1), the portion of the equalized spectrum Sq that originates from the sound driver 5 thus equals:

$$Sqe = Q \cdot Sze = Q \cdot (Sfe - W \cdot Sre) \quad (2)$$

Acoustic feedback in the array signal $A_{a1}$, $A_{a2}$ may therefore be reduced or eliminated by controlling W such that Sqe is reduced, ideally to zero. The latter may be achieved by controlling W according to:

$$W = Sfe/Sre \quad (3)$$

provided that Sre does not contain any spectral zeroes.

The sound $A_e$ emitted by the sound driver 5 is derived from the audio output signal $A_o$, and thus, equation (3) can be expanded to:

$$W = (Sfe/So)/(Sre/So) = Hfo/Hro \quad (4)$$

wherein Hfo and Hro are the transfer functions from the audio output signal $A_o$ to respectively the front microphone signal $A_{m1}$ and the rear microphone signal $A_{m2}$, $A_{m3}$. In the general case wherein a signal y dependent on another signal x is contaminated by noise uncorrelated to the other signal x, the transfer function Hyx from x to y may be estimated as:

$$Hyx = \overline{Pyx}/\overline{Pxx} \quad (5)$$

wherein $\overline{Pxx}$ is the average auto-power spectrum of x and $\overline{Pyx}$ is the average cross-power spectrum of x and y. Assuming that the sound $A_e$ emitted by the sound driver 5 is not correlated with the voice sound $A_v$, equation (4)/(5) may thus be further expanded to:

$$W = Hfo/Hro = (\overline{Pfo}/\overline{Poo})/(\overline{Pro}/\overline{Poo}) = \overline{Pfo}/\overline{Pro} \quad (6)$$

wherein $\overline{Pfo}$ is the average cross-power spectrum of the audio output signal $A_o$ and the front microphone signal $A_{m1}$, $\overline{Pro}$ is the average cross-power spectrum of the audio output signal $A_o$ and the rear microphone signal $A_{m2}$, $A_{m3}$, and $\overline{Poo}$ is the average auto-power spectrum of the audio output signal $A_o$.

The filter controller 64 may thus preferably repeatedly perform a cross-power analysis based on the audio output signal $A_o$, the front microphone signal $A_{m1}$ and the rear microphone signal $A_{m2}$, $A_{m3}$ and determine the transfer function W of the controllable filter 61 in dependence on the result of the cross-power analysis. The filter controller 64 may e.g. repeatedly estimate the average cross-power spectrum $\overline{Pfo}$ of the audio output signal $A_o$ and the front microphone signal $A_{m1}$ as well as the average cross-power spectrum Pro of the audio output signal $A_o$ and the rear microphone signal $A_{m2}$, $A_{m3}$ and determine the transfer function W of the controllable filter 61 in dependence on a quotient between the two estimated average cross-power spectra $\overline{Pfo}$, $\overline{Pro}$, e.g. according to equation (6).

The filter controller 64 may preferably repeat the determination of the transfer function W of the controllable filter 61 at a rate fast enough to ensure that typically encountered changes in the acoustic path between the sound driver 5 and the microphones 10, 11, 12 do not cause artifacts in the audio input signal $A_i$. Such changes may occur e.g. when users relocate or reorient the desktop speakerphone 1, or when users move themselves, their hands or other objects in the vicinity of the desktop speakerphone 1. This adaptation of the transfer function W may enable the desktop speakerphone 1 to provide a more robust suppression of acoustic feedback from the sound driver 5 compared to prior art speakerphones. The adaptation may be made at different speeds dependent on the intended use scenarios for a particular desktop speakerphone 1. The filter controller 64 may e.g. repeat the determination of the transfer function W of the controllable filter 61 once per frame or less frequently. Within the present document, the term "frame" bears the meaning it commonly has in connection with frequency-domain signals, namely a set of frequency bin values provided in a single step of converting a time-domain signal into a frequency-domain signal.

In a more robust embodiment, the filter controller 64 may iteratively determine the transfer function W of the controllable filter 61 by repeatedly determining and applying a frequency-dependent adjustment term dW to the transfer function W to counteract acoustic feedback in the difference signal $A_2$. An advantage of this approach is that the filter controller 64 may halt or slow down the adaptation of the transfer function W when adverse conditions for adaptation prevail, e.g. when local users speak, when the transfer function W is close to its optimum value and/or when Sre does contain spectral zeroes. Also, where or when the adaptation of W is to be made less frequently than once per frame, this may be achieved simply by setting the adjustment term dW equal to zero for intermediate frames, i.e. frames for which no adaptation shall be made.

The filter controller 64 may preferably determine the transfer function W according to:

$$W_{k+1} = W_k + U_k \cdot dW_k \quad (7)$$

wherein the index k represents the current frame number of the involved frequency-domain signals, $W_k$ is the current value of the transfer function W, $W_{k+1}$ is the subsequent value of the transfer function W, $dW_k$ is the adjustment term, and $U_k$ is a frequency-dependent moderation factor between 0 and 1. The filter controller 64 may preferably determine the adjustment term $dW_k$ such that if it were applied in the current frame, the portion Sze of the difference spectrum Sz that originates from the sound driver 5 would become zero. This value of the adjustment term $dW_k$ may be derived from equation (2). First, applying frame indices k to equation (2) and omitting the effect of the equalizer 63 yields:

$$Sze_k = Sfe_k - W_k \cdot Sre_k \quad (8)$$

Inserting the adjustment term $dW_k$ and the condition that $Sze_k$ be zero into equation (8) yields:

$$0 = Sfe_k - (W_k + dW_k) \cdot Sre_k \quad (9)$$

Solving the equation set (8) (9) for the adjustment term $dW_k$ yields:

$$dW_k = Sze_k/Sre_k \quad (10)$$

which following the reasoning further above from equation (3) through equation (6) may be expanded to:

$$dW_k = \overline{Pzo_k}/\overline{Pro_k} \quad (11)$$

wherein $\overline{Pzo_k}$ is the current value of the average cross-power spectrum of the audio output signal $A_o$ and the difference signal $A_z$ and $\overline{Pro_k}$ is the current value of the average cross-power spectrum of the audio output signal $A_o$ and the rear microphone signal $A_{m2}$, $A_{m3}$.

Figure 8:
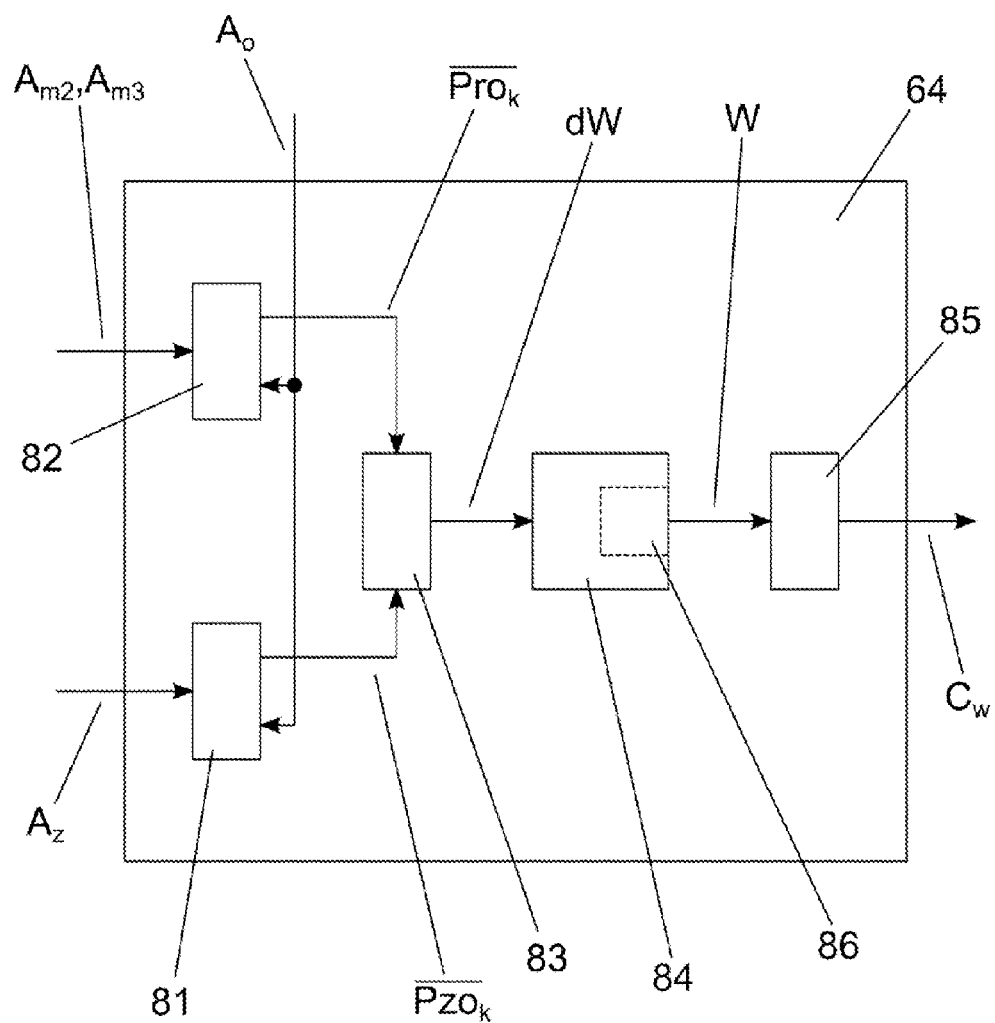
FIG. 8 shows details of a filter controller shown in FIGS. 6 and 7.

As shown in FIG. 8, the filter controller 64 may comprise a first spectral analyzer 81 that repeatedly estimates the average cross-power spectrum $\overline{Pzo_k}$ of the audio output signal $A_o$ and the difference signal $A_z$, a second spectral analyzer 82 that repeatedly estimates the average cross-power spectrum $\overline{Pro_k}$ of the audio output signal $A_o$ and the rear microphone signal $A_{m2}$, $A_{m3}$, an adjustment controller 83 that repeatedly determines the adjustment term dW, preferably in dependence on a quotient between the two estimated cross-power spectra $\overline{Pzo_k}$, $\overline{Pro_k}$, e.g. according to equation (11), a filter estimator 84 that repeatedly determines the transfer function W in dependence on the adjustment term dW, e.g. according to equation (7), and a converter 85 that repeatedly determines the first set of filter coefficients $C_w$ in dependence on the determined transfer function W, e.g. by Inverse Fast Fourier Transformation (IFFT), such that the transfer function of the controllable filter 61 becomes equal to the determined transfer function W.

It may be difficult to prevent the sound driver 5 from exitating spurious resonances in the housing 2 and other mechanical structures of the speakerphone 1. Such spurious resonances may cause substantial changes in the sound field surrounding the speakerphone 1 and thus also affect the microphone signals $A_m$ and eventually the determination of the transfer function W. Since such resonances are not correlated with the voice sound $S_v$, the filter controller 64 may treat the disturbances as feedback from the sound driver 5 and thus cause the transfer function W to deviate from its optimum. Spurious resonances may thus indirectly cause audible artefacts in the audio input signal $A_i$ provided to the audio communication network 20, in particular with a fast adaptation of the transfer function W. The filter controller 64 may preferably apply a spectral-domain low-pass filter function G to the determined transfer function W to reduce the effect of such spurious resonances. The spectral-domain low-pass filter function G acts to reduce differences between neighboring bins in the determined transfer function W. In other words, the spectral-domain low-pass filter function G smoothes the spectral shape of the transfer function W. The smoothing reduces the influence of narrow-band excursions in the spectrum of the acoustic feedback path from the sound driver 5 to the microphones 10, 11, 12, and since such narrow-band excursions are typically caused by resonances, this may generally improve the sound quality perceived by a remote party and/or allow for applying a faster adaptation of the transfer function W without deteriorating the sound quality.

The filter controller 64 may preferably apply the spectral-domain low-pass filter function G according to:

$$W_{k+1} = G(W_k + U_k \cdot dW_k) \quad (12)$$

which is a modified version of equation (7). Alternatively, the filter controller 64 may apply the spectral-domain low-pass filter function G according to:

$$W_{k+1} = W_k G(U_k dW_k) \quad (13)$$

such that the spectral-domain low-pass filter function G works on the moderated adjustment term $U_k \cdot dW_k$.

The filter estimator 84 may thus comprise a spectral-domain low-pass filter 86 that operates to reduce differences between neighboring bins in the determined transfer function W. The spectral-domain low-pass filter 86 may e.g. be configured to apply the spectral-domain low-pass filter function G by passing a sliding average window across the spectrum of each instance of the determined transfer function W and/or each instance of the moderated adjustment term $U_k \cdot dW_k$. Instead of a sliding average window, the spectral-domain low-pass filter 86 may apply one or more other suitable filters selected among low-pass filters generally known in the art.

The filter estimator 84 may preferably adaptively determine the moderation factor $U_k$ in a manner that favors reliable values of the adjustment term $dW_k$ over unreliable values, e.g. as described in further detail below.

The reliability of the adjustment term $dW_k$ generally decreases when the amount of acoustic feedback from the sound driver 5 in the microphone signals $A_f$, $A_r$ decreases relative to other signals, which typically is the case when local users speak. The filter estimator 84 may thus preferably adaptively monitor at least one of the microphone signals $A_f$, $A_r$ and increase the moderation factor $U_k$ in frequency bins wherein acoustic feedback from the sound driver 5 in a monitored microphone signal $A_f$, $A_r$ increases relative to other signals and adaptively decrease the moderation factor $U_k$ in frequency bins wherein acoustic feedback from the sound driver 5 in the monitored microphone signal $A_f$, $A_r$ decreases relative to other signals. To achieve this, the filter estimator 84 may e.g. determine a frequency-dependent coherence Cmo between the audio output signal $A_o$ and one of the front and the rear microphone signal $A_f$, $A_r$ and determine the moderation factor $U_k$ in dependence on the determined coherence Cmo. For each frequency bin, the coherence Cmo approaches 1 when acoustic feedback from the sound driver 5 dominates the respective microphone signal $A_f$, $A_r$ and drops towards 0 when other signals are mixed into the microphone signal $A_f$, $A_r$. The above approach may thus result in improved values of the transfer function W and thus in increased reduction of acoustic feedback in the audio input signal $A_i$.

The reliability of the adjustment term $dW_k$ further generally decreases when the amount of acoustic feedback from the sound driver 5 in the difference signal $A_z$ decreases relative to other signals, which typically is the case when the transfer function W is close to optimum. The filter estimator 84 may thus preferably, additionally or alternatively, adaptively increase the moderation factor $U_k$ in frequency bins wherein acoustic feedback from the sound driver 5 in the difference signal $A_z$ increases relative to other signals and adaptively decrease the moderation factor $U_k$ in frequency bins wherein acoustic feedback from the sound driver 5 in the difference signal $A_z$ decreases relative to other signals. To achieve this, the filter estimator 84 may e.g. determine a frequency-dependent coherence Czo between the audio output signal $A_o$ and the difference signal $A_z$ and determine the moderation factor $U_k$ in dependence on the determined coherence Czo. For each frequency bin, the coherence Czo approaches 1 when acoustic feedback from the sound driver 5 dominates the difference signal $A_z$ and drops towards 0 when other signals are mixed into the microphone signal $A_z$. The above approach may thus result in improved values of the transfer function W and thus in increased reduction of acoustic feedback in the audio input signal $A_i$.

The filter estimator 84 may preferably repeatedly determine the moderation factor $U_k$ in dependence on the coherence Cmo between the audio output signal $A_o$ and one of the front and the rear microphone signal $A_f$, $A_r$ as well as in dependence on the coherence Czo between the audio output signal $A_o$ and the difference signal $A_z$, e.g. according to:

$$U_k = Cmo_k \cdot (Czo_k + a)/(1+\beta) \quad (14)$$

wherein the index k is the current frame number, $Cmo_k$ is the current value of the frequency-dependent coherence Cmo between the audio output signal $A_o$ and one of the front and the rear microphone signal $A_f$, $A_r$, $Czo_k$ is the current value of the frequency-dependent coherence Czo between the audio output signal $A_o$ and the difference signal $A_z$, and $\beta$ is a small, non-zero, non-negative convergence term that may prevent the adaptation of the transfer function W to stop prematurely when approaching the optimum.

In other embodiments, the filter estimator 84 may apply variants of equation (14). For instance, the convergence term $\beta$ may be set to zero and/or the factor $Cmo_k$ may be set to unity. In other embodiments, the filter estimator 84 may apply other, preferably similar functions for computing the moderation factor $U_k$.

The filter controller 64 is preferably further configured to determine the transfer function W in a manner that is robust against spectral zeroes in the portion Sre of the rear microphone spectrum Sr that originates from the sound driver 5. This may e.g. be achieved by configuring the second spectral analyzer 82 to enforce a lower limit on the individual bin values of the average cross-power spectrum $\overline{Pro_k}$ of the audio output signal $A_o$ and the rear microphone signal $A_{m2}$, $A_{m3}$.

In the desktop speakerphone 1, the transceiver 22 preferably exchanges the audio output signal $A_o$ and the audio input signal $A_o$ in digital form with the audio communication network 20 and/or the gateway device 21, e.g. through a USB connection or a Bluetooth connection. Also, the output path 24 and the input path 25 are preferably configured as digital circuits operating on digital signals, possibly except for portions thereof that interface to the sound driver 5 and/or the microphones 10, 11, 12. Also, the output path 24 and the input path 25 are preferably configured to operate on spectral signals, in particular in order to facilitate the adaptation of the transfer function W. Most portions of the transceiver 22, the output path 24 and the input path 25 may, however, alternatively or additionally be configured to operate on time-domain signals and/or as analog circuits operating on analog signals. Accordingly, the transceiver 22, the output path 24 and/or the input path 25 may comprise any number of signal domain converters, i.e. analog-to-digital, digital-to-analog, time-to-spectral-domain (FFT) and/or spectral-to-time-domain (IFFT) converters, as well as any number of signal encoders and/or signal decoders to perform any required signal conversions, signal encoding and/or signal decoding.

Functional blocks of digital circuits may be implemented in hardware, firmware or software, or any combination hereof. Digital circuits may perform the functions of multiple functional blocks in parallel and/or in interleaved sequence, and functional blocks may distributed in any suitable way among multiple hardware units, such as e.g. signal processors, microcontrollers and other integrated circuits.

The detailed description given herein and the specific examples indicating preferred embodiments of the invention are intended to enable a person skilled in the art to practice the invention and should thus be seen mainly as an illustration of the invention. The person skilled in the art will be able to readily contemplate further applications of the present invention as well as advantageous changes and modifications from this description without deviating from the scope of the invention. Any such changes or modifications mentioned herein are meant to be non-limiting for the scope of the invention.

Examples of further changes or modifications include: the desktop speakerphone 1 may comprise further sound drivers 5, the housing 2 may have various shapes, the sound driver 5 may be mounted off-center with respect to the housing 2, the number of microphone clusters 6, 7 may be e.g. 1, 3, 4, 5 or 6 and the input path 25 may be modified accordingly, the sound inlets 13, 14, 15 of multiple microphone clusters 6, 7 may be arranged asymmetrically, the output path 24 and/or the input path 25 may comprise further functional blocks known from prior art speakerphones, such as e.g. decoders, audio filters, circulators and the like, the emphasis filter 31, the volume control 32 and/or the limiter 33 may be omitted, the user interface 36 may be omitted or arranged remotely, e.g. in a gateway device 21, the speech detector 42, the speech level normalizer 43 and/or the beam selector 44 may be omitted, the beam selector 44 may employ other or further criteria for selecting the preferred signal, the low-frequency array processor 53 and the low-pass filter 55 may be omitted, the residual-echo cancellers 57 may be omitted, the subtractor 62 may be replaced with an adder if the filtered signal $A_w$ and the front microphone signal $A_{m1}$ have opposite phases, etc.

The invention is not limited to the embodiments disclosed herein, and the invention may be embodied in other ways within the subject-matter defined in the following claims. As an example, features of the described embodiments may be combined arbitrarily, e.g. in order to adapt the devices according to the invention to specific requirements.

Any reference numerals and names in the claims are intended to be non-limiting for their scope.

The invention claimed is:

1. A desktop speakerphone comprising:
    a housing with a support surface for supporting the desktop speakerphone on a horizontal surface;
    an output path configured to provide a driver signal in dependence on an audio output signal;
    a sound driver arranged at the housing and configured to emit speaker sound in dependence on the driver signal;
    one or more microphone clusters each comprising multiple microphones configured to provide respective microphone signals in dependence on received voice sound;
    and an input path configured to provide an audio input signal in dependence on the multiple microphone signals,
wherein the input path comprises multiple array processors, each configured to provide an array signal in dependence on two or more of the multiple microphone signals, and wherein the input path further is configured to provide the audio input signal in dependence on two or more array signals,
wherein for each microphone cluster the input path comprises:
    a first array processor configured to provide a first one of the two or more array signals in dependence on a first pair of microphone signals, the first array signal having a first directivity pattern with a main lobe oriented in a first direction;
    and a second array processor configured to provide a second one of the two or more array signals in dependence on a second pair of microphone signals, the second array signal having a second directivity pattern with a main lobe oriented in a second direction different from the first direction,
wherein each of the first and the second directivity patterns exhibits reduced sensitivity towards the sound driver, characterized in that
each of the one or more microphone clusters further comprises:
    a first pressure microphone configured to provide a first microphone signal in dependence on voice sound received at a first sound inlet arranged at the housing;
    a second pressure microphone configured to provide a second microphone signal in dependence on voice sound received at a second sound inlet arranged at the housing;
    and a third pressure microphone configured to provide a third microphone signal in dependence on voice sound received at a third sound inlet arranged at the housing,
and further in that for each of the one or more microphone clusters:
    the first pair of microphone signals comprises the first microphone signal and the second microphone signal;
    the second pair of microphone signals comprises the first microphone signal and the third microphone signal;
    and the second and third sound inlets are arranged on mutually opposite sides of a median plane for the respective microphone cluster,
wherein for each microphone cluster the median plane extends through the first sound inlet and further comprises a center line that extends perpendicular to the support surface through the acoustic center of the sound driver.

2. A desktop speakerphone according to claim 1, wherein for each of the one or more microphone clusters, the second and third sound inlets are arranged symmetrically with respect to the median plane.

3. A desktop speakerphone according to claim 1, having at least two microphone clusters arranged such that their median planes are rotationally symmetric with respect to the center line.

4. A desktop speakerphone according to claim 1, wherein the input path further comprises an audio selector configured to adaptively select a set of array signals among the one or more array signals and to omit, attenuate and/or suppress in the audio input signal the array signals not in the selected set relative to those in the selected set.

5. A desktop speakerphone according to claim 4, and further comprising a voice detector configured to provide a voice activity signal indicating the presence, the loudness and/or the signal-to-noise ratio of a voice signal in one or more of the array signals, wherein the audio selector further is configured to adaptively select the set of array signals in dependence on the voice activity signal.

6. A desktop speakerphone according to claim 4, wherein the audio selector further is configured to select the set of array signals individually for each of multiple different frequency bands and within each of the multiple different frequency bands omit, attenuate and/or suppress in the audio input signal the array signals not in the respective selected set relative to those in the respective selected set.

7. A desktop speakerphone according to claim 1, and further comprising a directivity controller configured to adaptively control one or more of the directivity patterns to reduce acoustic coupling between the sound driver and the respective array signals.

8. A desktop speakerphone according to claim 7, wherein the directivity controller further is configured to halt or slow down adaptation of one or more directivity patterns in dependence on detecting adverse conditions for the adaptation.

9. A desktop speakerphone according to claim 7, wherein the directivity controller further is configured to perform a cross-spectral analysis of a signal provided to the sound driver and at least one of the one or more array signals and to control one or more directivity patterns in dependence on the output of the cross-spectral analysis.

10. A desktop speakerphone according to claim 1, wherein the input path further comprises an equalizer configured to compensate for level distortion caused by functional blocks of the input path.

11. A desktop speakerphone according to claim 1, wherein the input path further is configured to provide among the one or more array signals for one or more microphone clusters a mainly non-directional array signal in dependence on at least two microphone signals provided by the respective microphone cluster.

12. A desktop speakerphone according to claim 11, wherein the input path further comprises:

a third array processor configured to provide the mainly non-directional array signal in dependence on multiple microphone signals provided by the respective microphone cluster;

and one or more low-pass filters configured to reduce the level of high-frequency signal components in the mainly non-directional array signal.

13. A desktop speakerphone according to claim 12, wherein the input path further comprises a high-pass filter configured to reduce the level of low-frequency signal components in one or more of the array signals that are not subjected to filtering by the one or more low-pass filters.

14. A desktop speakerphone according to claim 11, and further comprising an echo canceller configured to reduce acoustic coupling between the sound driver and the mainly non-directional array signal.

15. A desktop speakerphone according to claim 1, wherein the input path further comprises a level controller configured to reduce level differences between voice signals comprised by the audio input signal.

* * * * *